US008231720B2

United States Patent
Knipe

(10) Patent No.: US 8,231,720 B2
(45) Date of Patent: Jul. 31, 2012

(54) MOLDWASH FORMULATION

(76) Inventor: Eric Von Knipe, Los Angeles, CA (US)

( * ) Notice: Subject to any disclaimer, the term of this patent is extended or adjusted under 35 U.S.C. 154(b) by 2 days.

(21) Appl. No.: 11/499,262

(22) Filed: Aug. 4, 2006

(65) Prior Publication Data

US 2007/0161532 A1 Jul. 12, 2007

Related U.S. Application Data

(63) Continuation-in-part of application No. 11/074,824, filed on Mar. 8, 2005, now abandoned.

(60) Provisional application No. 60/705,797, filed on Aug. 5, 2005, provisional application No. 60/552,025, filed on Mar. 9, 2004.

(51) Int. Cl.
*A01N 59/14* (2006.01)
*A01N 59/00* (2006.01)
*B08B 3/00* (2006.01)
*C11D 3/00* (2006.01)
*C11D 3/06* (2006.01)
*C11D 3/48* (2006.01)
*C11D 7/16* (2006.01)

(52) U.S. Cl. .......... 106/18.3; 106/15.05; 134/2; 134/42; 510/108; 510/199; 510/240; 510/245; 510/382; 510/405

(58) Field of Classification Search ............. 106/15.05, 106/18.3; 134/2, 42; 510/108, 199, 240, 510/245, 382, 405
See application file for complete search history.

(56) References Cited

U.S. PATENT DOCUMENTS

| | | |
|---|---|---|
| 4,224,169 A | 9/1980 | Retana et al. |
| 5,131,938 A | 7/1992 | Girvan |
| 5,270,108 A | 12/1993 | Savoy |
| 5,525,147 A | 6/1996 | Dunstan et al. |
| 6,037,316 A | 3/2000 | Garner et al. |
| 6,319,431 B1 | 11/2001 | Basson et al. |
| 6,416,789 B1 | 7/2002 | Marks et al. |
| 6,821,631 B2 | 11/2004 | Grantham et al. |
| 6,943,140 B2 * | 9/2005 | Ashton et al. ............... 510/278 |
| 2002/0146465 A1 | 10/2002 | Lloyd et al. |
| 2003/0104135 A1 * | 6/2003 | Grantham et al. ......... 427/397.8 |
| 2005/0217537 A1 | 10/2005 | Knipe |

FOREIGN PATENT DOCUMENTS

| | | |
|---|---|---|
| EP | 0 361 892 A | 4/1990 |
| WO | WO 2005/087462 | 9/2005 |

OTHER PUBLICATIONS

Miller, A., "Bad air breeds ailments in homes, schools, offices," The Atlanta Journal-Constitution: Jul. 20, 2003, http://ajc.printthis.clickability.com, available from www.ajc.com 10 pages.
Johanning, E., Auger, P. and Reijula, K. "Building-Related Illnesses," in 4pages.
White, M., Etzel, R., Wilcox, W. and Lloyd C., "Exacerbations of Childhood Asthma and Ozone Pollution in Atlanta," Environmental Research 65, 56-68 (1994).
International Search Report mailed Aug. 6, 2005.

* cited by examiner

*Primary Examiner* — Anthony J Green
(74) *Attorney, Agent, or Firm* — Eric Yohan Knipe

(57) ABSTRACT

The formulations and methods disclosed herein are useful for cleaning materials. In particular, the formulations and methods are useful for removing microbial organisms, including in particular, fungi, molds, mildews, and other microbes, from the treated materials. Further, the formulations and methods are adapted to suppress and/or eliminate the growth of microbes, particularly molds, associated with the treated materials.

2 Claims, No Drawings

MOLDWASH FORMULATION

CROSS-REFERENCE TO RELATED APPLICATION

This application claims the priority under 35 U.S.C. §119 (e) to U.S. Provisional Application No. 60/705,797, filed on Aug. 5, 2005. This application is also a continuation-in-part of application No. 11/074,824, filed Mar. 8, 2005 now abandoned, which claims the benefit under 35 U.S.C. §119(e) of U.S. Provisional Application No. 60/552,025, filed on Mar. 9, 2004.

BACKGROUND OF THE INVENTION

1. Field of the Invention

Preferred embodiments of the present invention are directed to formulations and methods for cleaning and treating materials, including wood, painted or treated surfaces, tile, stone, ceramics, fiberglass, plastic, metal, especially household and building materials, to remove mold and render the materials resistant to mold growth.

2. Description of the Related Art

The growth of mold (fungi) in structures, including homes, has become an officially-recognized source of serious illness. Mold, e.g., black mold (*stachybotrys chartarum*), has been found to cause flu-like and allergy-like symptoms. Skin rashes, inflammation of the respiratory tract, bloody noses, fever, headaches, neurological problems, and suppression of the immune system have all been linked to exposure to black mold. Its presence causes serious health problems, especially among children, and it has been blamed for several deaths. Various factors, including excessive moisture due to structural and drainage problems, encourage mold growth. In residential and commercial structures mold has been found to grow within walls, in carpeting and underlying padding, on sheetrock, and in insulation in walls and ceilings. Certain synthetic "stucco" construction materials have been found to trap moisture behind walls, resulting in a perfect breeding ground for mold. There have been numerous lawsuits involving mold growth in structures as a result of water leaks and improper drainage.

The Atlanta Journal-Constitution ran a two part article entitled "Sick Buildings/A Special Report" on Jul. 20-21, 2003, in which illnesses, including rashes, sinus problems, flu-like conditions, and chronic respiratory illness were among the health problems associated with indoor mold. The article cited a 1994 study in which Dr. Dorr Dearborn and Dr. Ruth Etzel, an epidemiologist with Atlanta's Center for Disease Control and Prevention ("CDC") noted a pattern of pulmonary hemorrhage in Cleveland infants which were attributed to *stachybotrys chartarum* and other molds. The article further cited a 1998 study by Dr. Eckardt Johanning, a physician at the Mount Sinai School of Medicine in which he studied 151 patients who had been exposed to mold and found about half of them had central nervous system complaints, such as concentration problems, dizziness, and fatigue.

While all researchers are not convinced that there has been adequate study of the relationship of mold to illness, 17 states have introduced legislation related to mold, and there is a bill pending in Congress to study health problems caused by mold, and the CDC has asked the Institute of Medicine, a national advisory group, to study the medical damage from mold.

While some people do appear to be bothered by mold more than others, all varieties have the potential to cause illness. Mold triggers allergic reactions, asthma attacks, fungal infections in the lungs of people with chronic medical conditions, and hypersensitivity pneumonitis, an inflammation of the lungs. Some molds, e.g., *Stachybotrys chartarum*, are known to produce toxins that can be inhaled. In 1999 doctors at the Mayo Clinic concluded that mold may be responsible for a majority of the sinus infections in the United States.

As mold has been found to affect people in a variety of detrimental ways, a simple, effective, inexpensive formulation and method for cleaning existing mold and suppressing and/or eliminating mold would be very desirable.

SUMMARY OF THE INVENTION

A formulation is disclosed for cleaning and rendering materials mildew and mold resistant. The formulation comprises a boron-containing aqueous solution, an alkyl and/or aryl sulfonate, one or more surfactants, a fungicide/mildewcide, and aqueous ammonia.

The boron-containing aqueous solution preferably comprises from about 8-12% by weight of a metallic borates, selected from the group consisting of disodium tetraborate decahydrate, disodium octaborate tetrahydrate, sodium metaborate, sodium perborate monohydrate, disodium octaborate, sodium tetraborate pentahydrate, sodium tetraborate, copper metaborate, potassium borate, and zinc borate.

The alkyl and/or aryl sulfonate preferably comprises sodium xylene sulfonate.

The one or more surfactants preferably comprise a combination of a nonionic and an anionic surfactant. Preferably, the nonionic surfactant is an alcohol ethoxylate and the anionic surfactant is ammonium lauryl ether sulfate.

The fungicide/mildewcide is preferably POLYPHASE® P20T.

A formulation for cleaning and rendering materials resistant to molds and mildew is disclosed consisting essentially of 60-80% by weight soft water, 8-12% by weight metallic borate, 3-6% by weight Trisodium Phosphate, 1-3% by weight nonionic surfactant, 0.1-1% by weight fungicide/mildewcide, 0.1 -1% by weight anionic surfactant, 1 -10% by weight sodium xylene sulfonate, 0.01-1% by weight fragrance, 0.01-1% by weight KEYFLUOR WHITE P LIQUID, 0.5-5% by weight aqueous ammonia, and a coloring agent.

A method is also disclosed for cleaning and rendering materials resistant to molds and mildew. The method comprises the step of contacting said material with a formulation described above.

DETAILED DESCRIPTION OF THE PREFERRED EMBODIMENT

The formulations and methods disclosed herein are useful for cleaning materials. In particular, the formulations and methods are useful for removing microbial organisms, including fungi, molds, bacteria, and other microbes, from the treated materials. Further, the formulations and methods are adapted to suppress and/or eliminate the growth of microbes, particularly molds, associated with the treated materials.

One composition in accordance with a preferred embodiment of the present invention is a solution comprising a boron-containing solution, preferably having a boric acid equivalent ranging from about 1-90%, 1-14% or 8-12%, and most preferably from about 10-12% by weight. Any boric acid source may be used in accordance with embodiments of the present invention. In preferred embodiments, the boron compound is selected from the group consisting of perborates, metaborates, tetraborates, octaborates, and borate esters. More preferably, the boron compound comprises metallic borates, such as disodium tetraborate decahydrate, disodium octaborate tetrahydrate, sodium metaborate, sodium perborate monohydrate, disodium octaborate, sodium tetraborate pentahydrate, sodium tetraborate, copper metaborate, potassium borate, and zinc borate. One of the benefits of using a metallic borate is its chemical stability over time.

In preferred variations, the boron-containing solution further comprises a fungicide/mildewcide. Any fungicide/mildewcide may be used in accordance with embodiments of the present invention. Liquid non-metallic products may be used in accordance with preferred variations. Preferred commercially available fungicide/mildewcides can be found at troycorp.com, including for example, 2-iodo-2-propynyl butyl carbamate, POLYPHASE® 604, 641, 678, AF1, EC17, LTP, P100, P20T, SA27, WD17, and TROYSAN® 1005.

In another preferred variation, the boron-containing solution further comprises a solvent adapted to solubilize organic surface active agents and/or organic polymers. Preferred solvents may also act as coupling agents and/or hydrotropes. Sulfonates may be used in accordance with preferred embodiments, such as, for example, sodium xylene sulfonate. Preferred commercially available solvents may be purchased from Pilot Chemical Co., for example, PILOT SXS-40.

In another preferred variation, the boron-containing solution further comprises one or more surfactants. Preferably, one surfactant is a biodegradable liquid anionic surfactant, adapted to provide detergent foaming action, particularly when used in combination with sulfonate solvents, such as those described above. Preferred surfactants include ammonium salts, such as ammonium lauryl ether sulfate. Preferred commercially available anionic surfactants include CAL-FOAM® EA-603, available from Pilot Chemical Co. In some embodiments, two surfactants may be used, including preferably an anionic and a nonionic surfactant. Preferred nonionic surfactants include alcohol ethoxylates, which are particularly effective wetting agents when used in concert with anionic surfactants, like ammonium lauryl ether sulfate. Preferred commercially available nonionic surfactants include TOMADOL® 91-8 alcohol ethoxylate from Tomah Products, Inc.

In other preferred variations, the boron-containing solution may further comprises one or more additional additives, selected from the group consisting of phosphate salts (e.g., trisodium phosphate TPS), a fragrance (e.g., Febreze Type Fragrance #305382-0304AA Belmay), a fluorophore (which fluoresces under UV light; e.g., KEYFLUOR WHITE P LIQUID 915-061-45) and/or whitening agent(s) (e.g., tetra or hexasulfonates), Ammonia (e.g., aqueous ammonia, 26-Degree Baumé Ammonium Hydroxide solution is equivalent to 29.4% by weight of ammonia dissolved in water-since the Baumé reading varies with temperature, the reading is standardized at 60° F.), and coloring agents (e.g., Key Acid Fast Blue RB 201-025-51). Optionally, the formulation may incorporate foaming agents, for certain applications, or whitening agents for bath, kitchen or tile cleaning.

TABLE 1

Moldwash formulation

| Percent by weight | Ingredient | Pounds |
| --- | --- | --- |
| 78.2994 | Water, soft | 7829.94 |
| 10.00 | Boron-containing solution | 1000.00 |
| 4.75 | Trisodium Phosphate | 475.00 |
| 2.90 | Solvent | 290.00 |
| 2.00 | Nonionic surfactant | 200.00 |
| 1.10 | Aqueous ammonia | 110.00 |
| 0.45 | Fungicide/mildewcide | 45.00 |
| 0.30 | Anionic surfactant | 30.00 |
| 0.10 | Fragrance | 10.00 |
| 0.10 | Fluorophore | 10.00 |
| 0.0006 | Coloring agent | 0.06 |
| 100.00 | TOTAL | 10,000 |

A preferred moldwash formulation is shown in TABLE 1. In a test solution based on the TABLE 1 ingredients, prepared in accordance with preferred embodiments, the boron-containing solution comprised 10% boric acid equivalents, the solvent was PILOT SXS-40, the nonionic surfactant was TOMADOL® 91-8, the fungicide/mildewcide was POLYPHASE® P20T, the anionic surfactant was CAL-FOAM® EA-603, the fragrance was Febreze Type Fragrance #305382-0304AA Belmay, the fluorophore was KEYFLUOR WHITE P LIQUID 915-061-45, and the coloring agent was Key Acid Fast Blue RB 201-025-51. This solution showed excellent results in removing mold and in suppressing mold growth and exhibits a positive UV light signal, which can be used to confirm application of the moldwash. The specific gravity was 1.043±0.0005, the pH was 9.82±0.5, the color was clear, dark blue, the R.I. was 10.50±0.5, UV check was positive, and the cloud point was 52° C.

The ingredients of the moldwash formulations prepared in accordance with preferred embodiments of the present invention are mixed with water, preferably soft water, to form an aqueous solution adapted to spray onto surfaces to be treated. Of course, any other means of applying the moldwash formulations may be adopted, including pouring on, dampening a applicator, e.g., a sponge, cloth, or a brush, and spreading on, immersing the material to be treated in the solution, etc.

Any materials may be treated with the preferred moldwash formulations of the present invention, including without limitation, tiles, ceramics, porcelains, stone, any wood products including sealed wood, stained wood, painted wood, etc., painted drywall, plastics (e.g., plastic shower enclosures), synthetics, composites, polymers, etc. In preferred embodiments, the moldwash formulations may be provided to consumers in spray bottles with or without refills, applicators that include cleaner reservoirs, pretreated sponges or clothes, etc.

Generally, molds, mildew, fungal and/or microbial infestations on materials, e.g., household, laboratory, or building surfaces are removed by applying a sufficient amount of the moldwash formulation to wet the entire surface of the material to be treated. The formulation is preferably wiped, rubbed, or sponged about to thoroughly contact and moisten the affected area. The surface is then preferably wiped clean. In alternative methods, the formulation may be sprayed onto the surface. Alternatively, the formulation may be applied to a sponge, cloth, etc, which is contacted with the surface to be treated. For large surface areas, pressurized sprayers may be employed. Foaming agents may be included in the formulation to provide application and treatment of difficult to reach areas that present mold infestation, e.g., behind walls, etc.

Industrial and/or commercial uses are also deemed within the scope of the present invention. For example, landlords may use the moldwash to remediate mold problems in buildings.

Insurance companies or other parties or agencies can monitor compliance with application guidelines in preferred embodiments by the presence of a UV-sensitive fluorophore.

Those skilled in the art will recognize or be able to ascertain, using no more than routine experimentation, many equivalents of the specific embodiments of the invention described therein. Such equivalents are intended to be encompassed by the following claims.

What is claimed is:

1. A formulation for cleaning and rendering materials resistant to molds and mildew, consisting essentially of 60-80% by weight soft water, 8-12% by weight metallic borate, 3-6% by weight "Tri Sodium Phosphate", 1-3% by weight nonionic surfactant, 0.1-1% by weight fungicide/mildewcide, 0.1-1% by weight anionic surfactant, 1-10% by weight sodium xylene sulfonate, 0.01-1% fragrance, 0.01-1% by weight Fluorescent Whitening Agent, 0.5-5% aqueous ammonia, and a coloring agent.

2. A method for cleaning and rendering materials resistant to molds and mildew, comprising the step of contacting said materials with a formulation of claim 1.

* * * * *